United States Patent [19]

Kim

[11] Patent Number: 5,555,431
[45] Date of Patent: Sep. 10, 1996

[54] VARIABLE MAGNIFICATION FINDER

[75] Inventor: Moon-hyun Kim, Changwon-si, Rep. of Korea

[73] Assignee: Samsung Aerospace Industries, Ltd., Kyeongsangnam-do, Rep. of Korea

[21] Appl. No.: 503,922

[22] Filed: Jul. 19, 1995

[30] Foreign Application Priority Data

Jul. 21, 1994 [KR] Rep. of Korea .................... 94-17639

[51] Int. Cl.$^6$ .............. G03B 13/10; G02B 15/14
[52] U.S. Cl. ........................... 354/222; 359/676
[58] Field of Search ............. 354/222; 359/676, 359/686

[56] References Cited

U.S. PATENT DOCUMENTS

| | | | |
|---|---|---|---|
| 4,842,395 | 6/1995 | Sato et al. | 359/380 |
| 5,144,349 | 9/1992 | Kato et al. | 354/222 |
| 5,232,264 | 6/1994 | Kato | 354/222 |
| 5,247,324 | 9/1993 | Estelle | 354/222 |
| 5,448,411 | 9/1995 | Morooka | 354/222 |

FOREIGN PATENT DOCUMENTS

| | | |
|---|---|---|
| 61-156018 | 7/1986 | Japan . |
| 6-18780 | 1/1994 | Japan . |
| 6-151197 | 5/1994 | Japan . |

Primary Examiner—Michael L. Gellner
Assistant Examiner—Eddie C. Lee
Attorney, Agent, or Firm—Finnegan, Henderson, Farabow, Garrett & Dunner, L.L.P.

[57] ABSTRACT

A variable magnification finder has an objective lens group having an overall positive power. A first lens group and a second lens group each have a negative refractive power; a third lens group and a fourth lens group each have a positive refractive power; and an eyepiece lens group has a positive power. The second and third lens groups move to zooming from the wide angle position to the telephoto position, and compensate the change of an aberration resulting from such movement of the second and third lens groups.

11 Claims, 6 Drawing Sheets

VARIABLE MAGNIFICATION FINDER

BACKGROUND OF THE INVENTION

1. Field of the Invention

The present invention relates to a variable magnification finder for use in cameras. More particularly, the invention relates to a finder wherein an objective lens is constructed simply and compactly, by which means a wide angle field of view can be obtained.

2. Description of the Related Art

Conventionally, most compact cameras employ a virtual image finder such as an Albada finder or a reverse Galilean finder. Such finders provide a relatively wide angle of view and have a compact construction because a prism for erecting the image is not required. However, in such finders, the closest lens to an object must be large in size, and the view field of the finder blurs in the marginal zone.

Because of the drawbacks in virtual image finders and continuous requirements to improve compact cameras, cameras may employ a real image finder instead of a virtual image finder. A panorama function is also available in a real image finder.

U.S. Pat. No. 4,842,395 entitled "Finder of Variable Magnification"; Japanese Patent Laid-Open No. SHO 61-156018 entitled "Variable Magnification Finder"; Laid-Open No. PYEONG 6-151197 entitled "Real Image Finder"; and Laid-Open No. 6-18780 entitled "Variable Magnification Finder Optical System" disclose real image finders.

In the disclosed finders, an objective lens group and a condenser lens group form an objective image, and the image is observed through an enlarged eyepiece. However, the image formed by the objective lens group is positioned on the marginal zone of the view field, so that the view field is subject to restriction, i.e., the image is divided by the marginal zone of the view field. When constructing a finder without the division of the image, however, the resultant finder becomes large and complicated.

When a camera is made compact, a moderately wide field of view may be achieved by shortening the focal distance of the objective lens at the wide angle position. However, the image formed through the objective lens is small. Also, the refractive power of the objective lens increases as the focal length shortens, and it is difficult to compensate aberration.

SUMMARY OF THE INVENTION

The present invention overcomes the problems and disadvantages of the prior art by providing a variable magnification finder which is compact and enables a wide angle of view. Manufacturing costs are lowered because the lens is made from inexpensive material, while still permitting high magnification and good aberration performance throughout the range at the wide angle position.

In order to achieve the above object, the present invention, as embodied and broadly defined herein, provides a variable magnification finder comprising an objective lens group having an overall positive power, including, sequentially from an object, a first lens group and a second lens group each having a negative refractive power, a third lens group and a fourth lens group each having a positive refractive power, and an eyepiece lens group having a positive refractive power. The second and third lens groups move to zooming from the wide angle position to the telephoto position, and compensate the change of an aberration resulting from such movement of the second and third lens groups.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIGS. 2(a)–2(f) are diagrams showing the aberrations of the optical system of FIG. 1;

FIGS. 4(a)–4(f) are diagrams showing the aberrations of the optical system of FIG. 3;

FIGS. 6(a)–6(f) are diagrams showing the aberrations of the optical system of FIG. 5.

DESCRIPTION OF THE PREFERRED EMBODIMENTS

An embodiment of the present invention is described in detail below with reference to the accompanying drawings.

Figure 1:
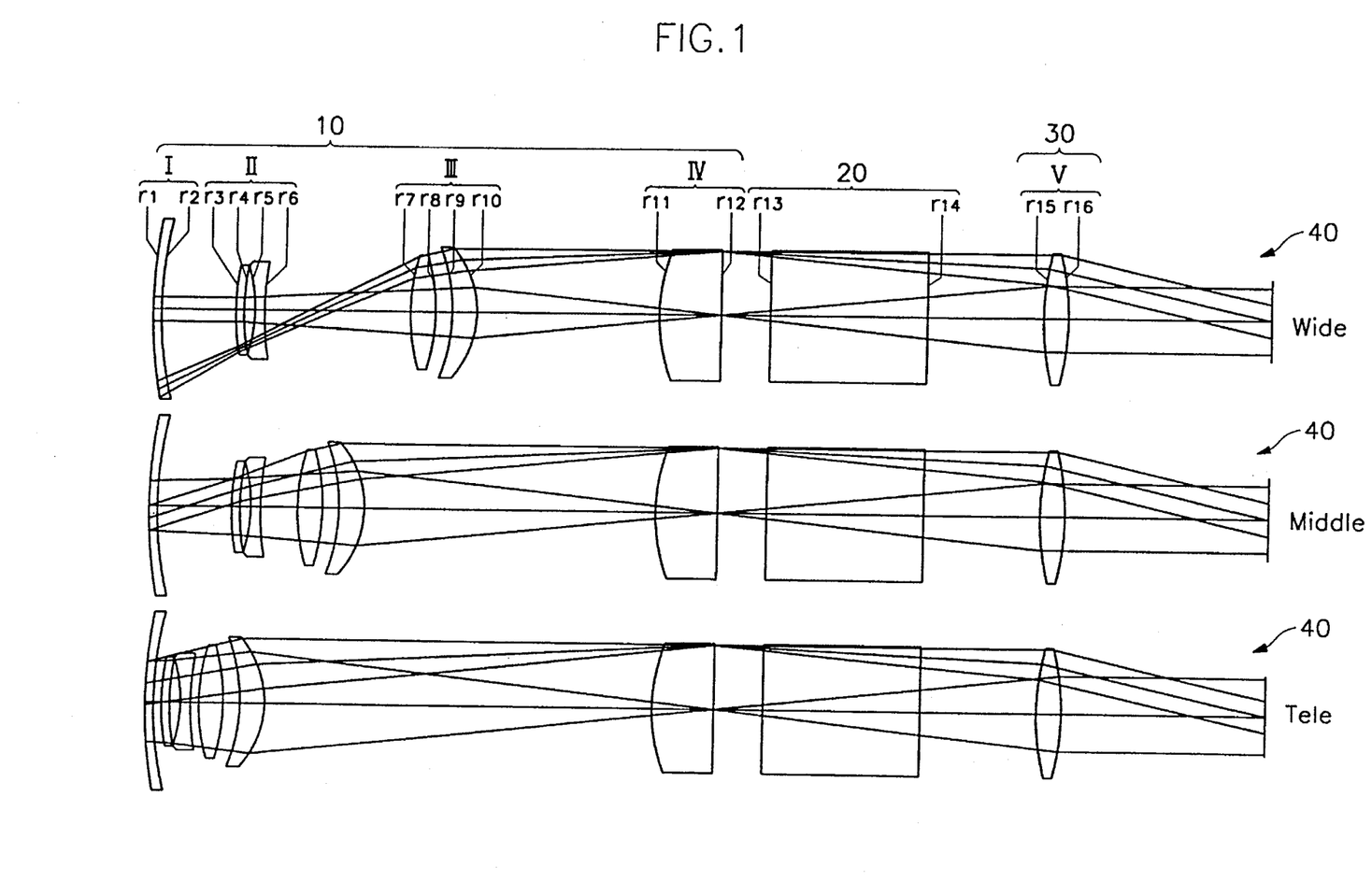
FIG. 1 is a schematic longitudinal sectional view of an embodiment of an optical system according to the present invention at wide, normal, and telephoto fields of view.
Figure 2A:
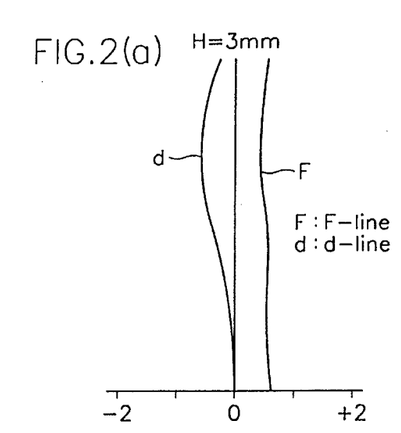
Figure 2B:
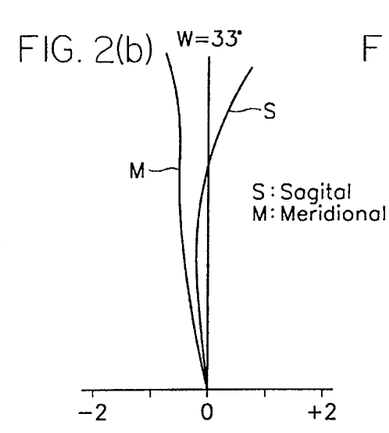
Figure 2C:
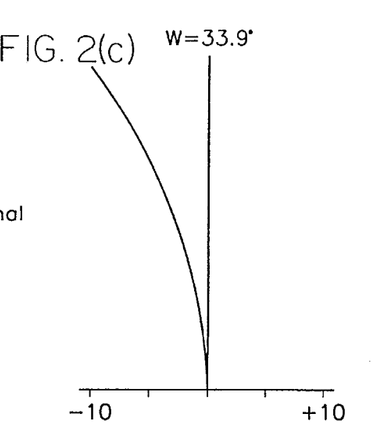
Figure 2D:
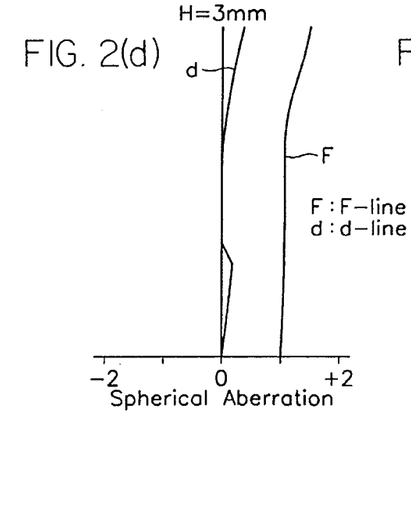
Figure 2E:
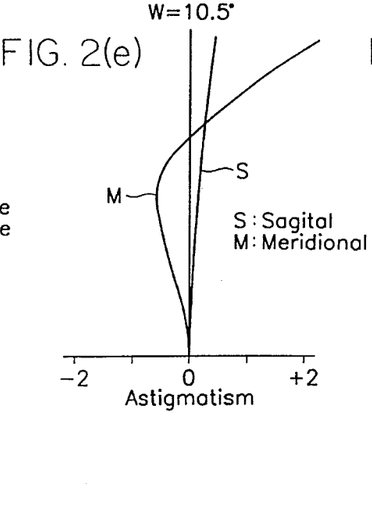
Figure 2F:
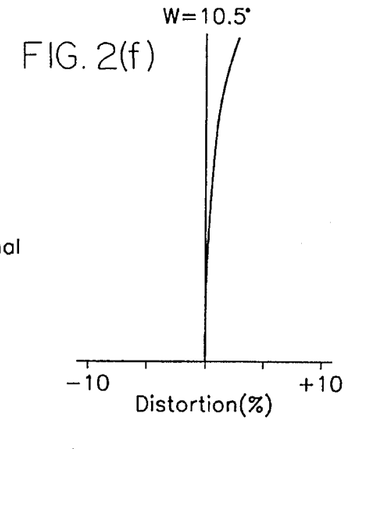
Figure 3:
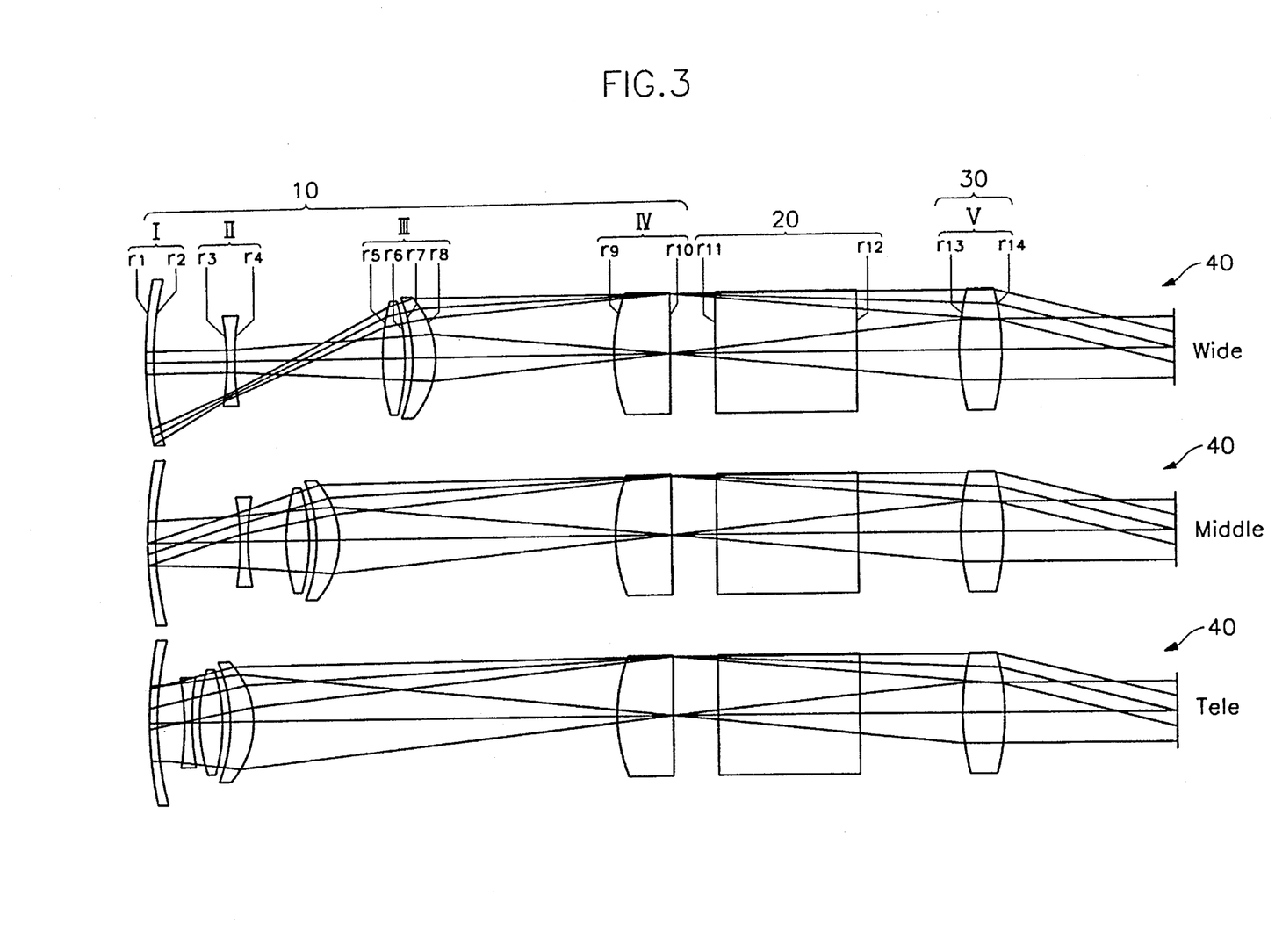
FIG. 3 is a schematic longitudinal sectional view of another embodiment of an optical system according to the present invention at wide, normal, and telephoto fields of view.
Figure 4A:
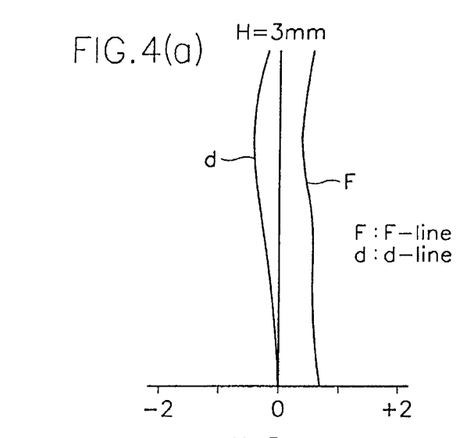
Figure 4B:
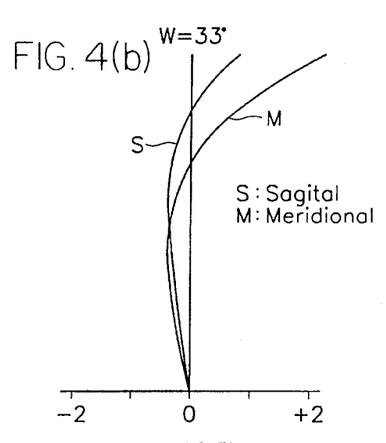
Figure 4C:
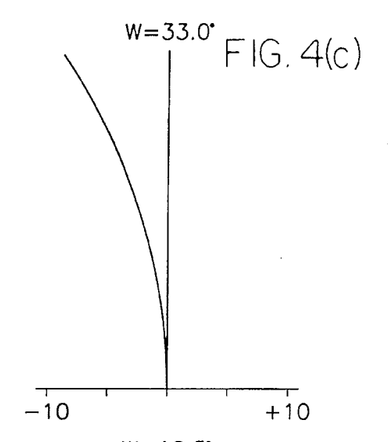
Figure 4D:
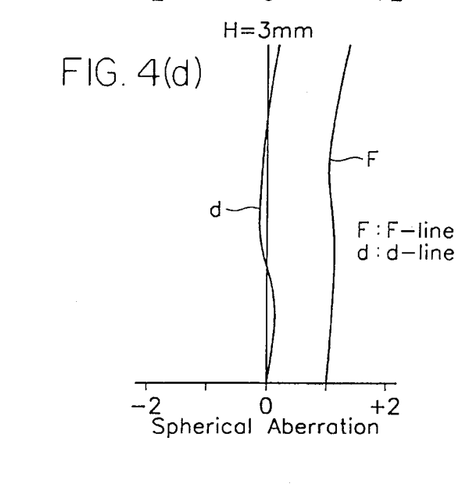
Figure 4E:
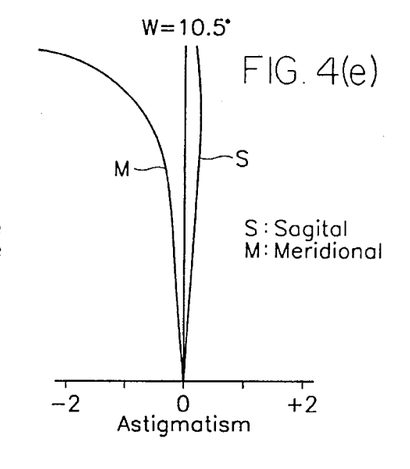
Figure 4F:
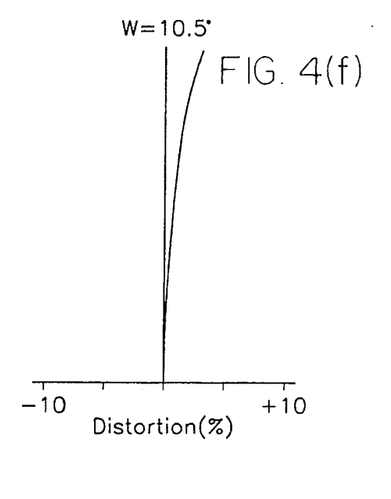
Figure 5:
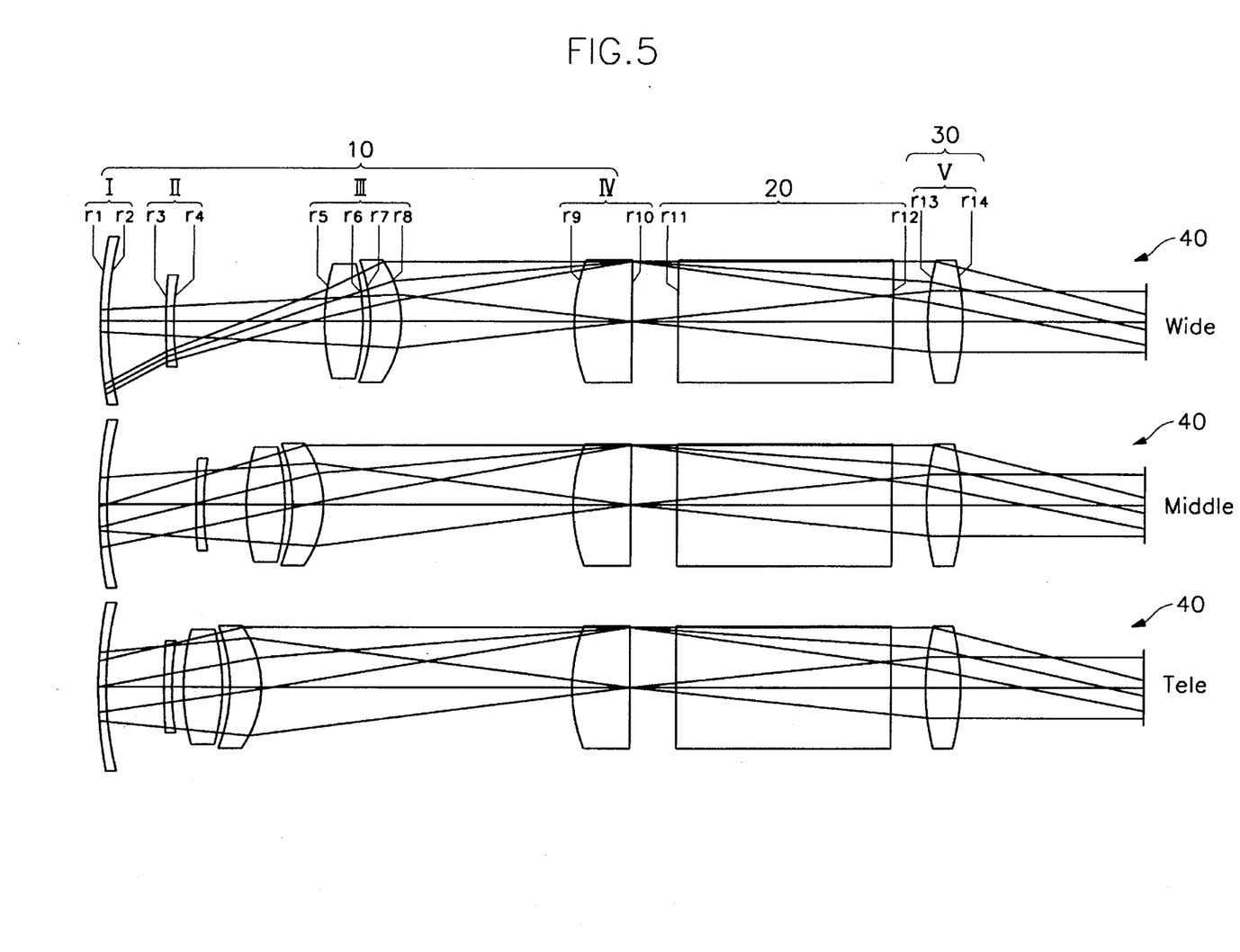
FIG. 5 is a schematic longitudinal sectional view of still another embodiment of an optional system according to the present invention at wide, normal, and telephoto fields of view.
Figure 6A:
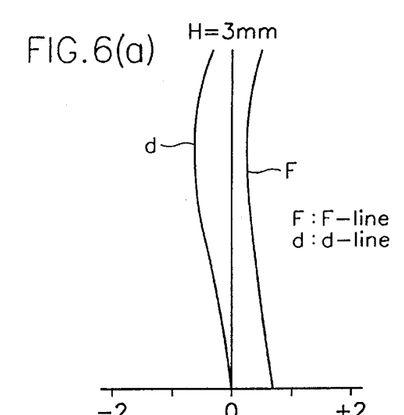
Figure 6B:
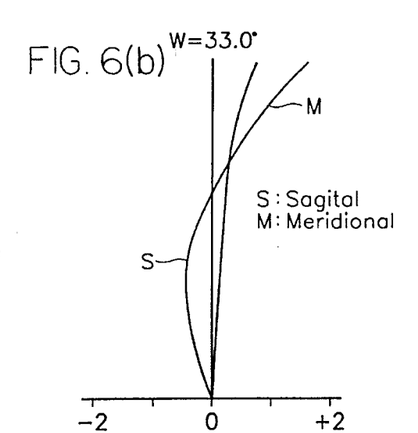
Figure 6C:
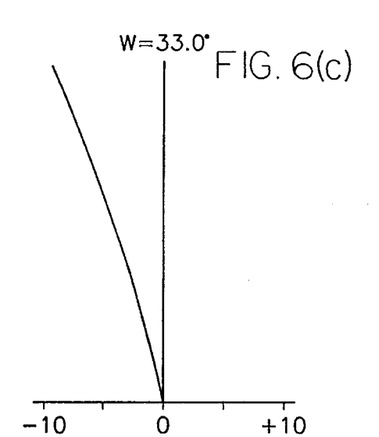
Figure 6D:
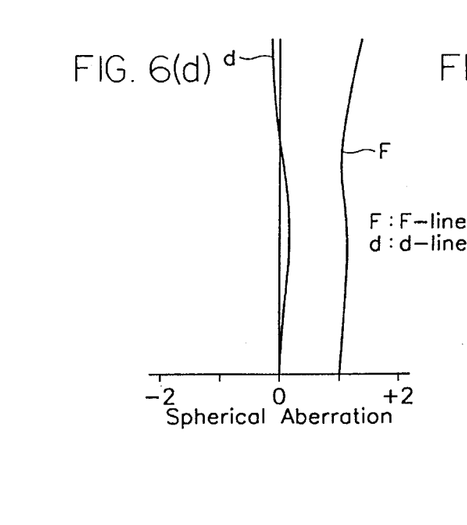
Figure 6E:
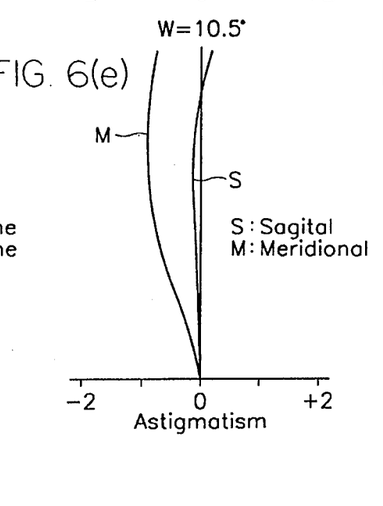
Figure 6F:
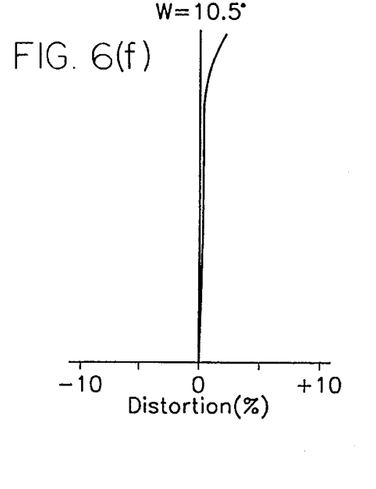

The variable magnification finders shown in FIGS. 1, 3, and 5 each include, a fixed first lens group I having a negative refractive power, a movable second lens group II having a negative refractive power, a movable third lens group III having a positive refractive power, and a fixed fourth lens group IV having a positive refractive power. The first, second, third, and fourth lens groups constitute an objective lens 10 having an overall positive refractive power. The first lens group I is closest to the object.

The finders further include an eyepiece 30 having a positive refractive power and a reflecting means 20 mounted between the objective lens 10 and the eyepiece 30 for rendering an objective image as an erect image. The reflecting means 20 may be a prism.

Each lens group I, II, III, and IV may be made from a single material, preferable a plastic. Particularly, in this embodiment, a plastic material called "PMMA" may be used. While using only one material decreases manufacturing costs, using only one material also increases the difficulty of compensating for chromatic aberration magnification. This difficulty can be overcome by a suitable arrangement of each lens and by using an asperipherical objective lens 10 and an asperipherical eyepiece 30.

The features of the invention are described in detail below. In a preferred embodiment, the first lens group I having a positive refractive power is fixed from an object to simplify the configuration of a lens barrel. The first lens group I serves as a finder cover glass which prevents the second lens group II and the third lens group III from being contaminated by dust, etc. The second lens group II serves as a compensation part, while the third lens group III serves as a magnification part. The refractive power of the second lens group II, having a negative refractive power, is divided with the first lens group I so that the resulting aberration from the compensation part having the larger power of the two is reduced.

The object side of the second lens group II is convex. Thus, the second lens group II (the compensation part) compensates for COMA aberration even though the first lens group becomes thick. Good image performance can be obtained throughout the whole range of a finder without a drop in image performance resulting from the movement of a pupil within the view.

In the embodiment shown in FIG. 1, the objective lens 10 magnifies with a positive refractive power. In particular, the fourth lens group IV has a positive refractive power and serves as a condenser lens. The fourth lens group IV is in the rear of the magnification part to minimize the size of the eyepiece 30 and the prism 20 in the compact finder system.

The image is focused on the image side of the fourth lens group IV on the image plane 40. Accordingly, the image side of the fourth lens group IV is plane. This construction allows the four lens groups to be used even if the zone mark or the marginal frame to the viewing field is not formed on its side. Additionally, a simply constructed panorama system can be achieved when a panorama means is installed on its side.

Accordingly, the fourth lens group IV has a plane side and a convex side toward an object.

Further, in the real image finder, dust on a focusing side, i.e., a first image forming side, may be undesirable seen through the finder. In this embodiment, to solve this problem, a condenser lens is constructed as thick as possible so that dust toward an object is out of the view field.

The foregoing features accomplish objects of the invention. To construct the lens of the variable magnification finder relatively simply, while still preserving acceptable aberration performance throughout the variable magnification range, the variable magnification finder may also incorporate the following features.

In the objective lens 10, the front surface of the first lens group I is convex toward an object, or the first lens group I is one lens with one plane surface having a negative refractive power. Further, the second lens group II has one lens or a plurality of lenses having a negative refractive power with one surface concave toward an eyepiece. Still further, the third lens group III includes at least one lens having a positive refractive power with one surface convex toward an object and an eyepiece. Still further, the fourth lens group IV has one lens with a positive refractive power, a convex surface toward an object, and a plane surface toward an eyepiece.

When the foregoing conditions are satisfied, the objective lens 10 including the first, second, third, and fourth lens groups I to IV has an overall positive refractive power. Also, the objective lens 10 has a larger overall positive refractive power when an image is focused near the fourth lens group IV, i.e., the condenser lens group where the image is formed initially.

The objective lens 10 achieves good aberration performance by: dividing the overall refractive power between the first to fourth lens groups I to IV, compensating the spherical aberration generated by the third lens group III and the fourth lens group IV with the second lens group III, and dividing the negative refractive power of the first and second lens groups I and II.

The objective lens 10 which meets the foregoing conditions is varied by moving the third lens group III having a positive refractive power. At that time, resulting parallax is compensated by moving the second lens group II having a negative refractive power.

Consequently, the finder provides good overall aberration performance.

In this invention, the aspherical lens of the variable magnification finder is expressed as following:

$$X = \frac{Cy^2}{1 + \{1 - (K+1)C^2y^2\}^{1/2}} + A_4y^4 + A_6y^6 + A_8y^8 + A_{10}y^{10}$$

In this equation, X denotes the optical axial thickness from the lens vertex; y the vertical thickness of the optical axis; C the reciprocal number of the radius of curvature; K the conic number; and $A_4$, $A_6$, $A_8$ and $A_{10}$ the aspherical coefficients.

FIGS. 2(a)–2(f) show the aberrations of the optical system shown in FIG. 1. FIGS. 3 and 5 show different embodiments of the optical system in accordance with this invention, and FIGS. 4(a)–4(f) and 6(a)–6(f) show the aberrations of the optical systems shown in FIGS. 3 and.

Three examples of specific optical systems are shown in Tables 1–24. Tables 1–8 correspond to the embodiment shown in FIG. 1. Tables 9–16 correspond to the embodiment shown in FIG. 23, and tables 17–24 correspond to the embodiment shown in FIG. 5.

In tables 1–24, the half viewing angle equals ω, the axial thicknesses of air separations equals D. The refractive indices and the Abbe numbers of the glasses of the lens elements are given by N and v. The subscripts are numbered consecutively from object to image (left to right in FIGS. 1, 3, and 5). In Tables 1–24 all distances are given in millimeters.

Tables 2, 10, and 18 show the air separation for different viewing angles 20 at a wide angle of view, 21.0°, a normal angle of view 31.8°, and a telephoto angle of view, 65.9°.

Tables 3–8, 11–16, and 19–24 show the conic number K and the aspherical coefficients for the lens elements.

TABLE 1

| Magnification = −0.39 to −1.172 | | | |
|---|---|---|---|
| Radius | Distance | Refractive Index | Abbe Number |
| R1 = 47.021 | D1 = 0.80 | N1 = 1.49200 | v1 = 57.4 |
| R2 = 21.718 | D2 = Variable | | |
| R3 = 20.000 | D3 = 0.80 | N3 = 1.49200 | v3 = 57.4 |
| R4 = 15.364 | D4 = 1.03 | | |
| R5 = 16.684 | D5 = 0.80 | N5 = 1.49200 | v5 = 57.4 |
| R6 = 7.169 | D6 = Variable | | |
| R7 = 17.049 | D7 = 2.07 | N7 = 1.49200 | v7 = 57.4 |
| R8 = −15.364 | D8 = 1.65 | | |
| R9 = −19.619 | D9 = 2.45 | N9 = 1.49200 | v9 = 57.4 |
| R10 = −9.006 | D10 = Variable | | |
| R11 = 25.574 | D11 = 5.50 | N11 = 1.49200 | v11 = 57.4 |
| R12 = ∞ | D12 = 4.80 | | |
| R13 = ∞ | D13 = 14.80 | N13 = 1.49200 | v13 = 57.4 |
| R14 = ∞ | D14 = 11.11 | | |
| R15 = 32.868 | D15 = 2.34 | N7 = 1.49200 | v15 = 57.4 |
| R16 = −21.495 | D16 = 18.95 | | |

TABLE 2

| D | $2\omega = 21.0°$ | $2\omega = 31.8°$ | $2\omega = 65.9°$ |
|---|---|---|---|
| D2 = | 1.000 | 6.427 | 6.236 |
| D6 = | 1.000 | 6.657 | 14.000 |
| D10 = | 35.904 | 27.819 | 17.670 |

TABLE 3

Aspherical Coefficient of R2

$K = 0.3069989 \times 10$
$A_4 = -0.10019439 \times 10^{-3}$
$A_6 = -0.86741314 \times 10^{-6}$
$A_8 = 0$
$A_{10} = 0$

TABLE 4

Aspherical Coefficient of R5

$K = -0.19107742 \times 10^{+2}$
$A_4 = -0.46861886 \times 10^{-2}$
$A_6 = 0.25666468 \times 10^{-3}$
$A_8 = -0.10889761 \times 10^{-4}$
$A_{10} = 0.21014519 \times 10^{-6}$

TABLE 5

Aspherical Coefficient of R6

$K = -0.13216630 \times 10^{+2}$
$A_4 = -0.20765375 \times 10^{-2}$
$A_6 = 0.99140566 \times 10^{-4}$
$A_8 = -0.35976467 \times 10^{-5}$
$A_{10} = 0.61721120 \times 10^{-7}$

TABLE 6

Aspherical Coefficient of R7

$K = -0.59009749 \times 10^{+2}$
$A_4 = 0.81157548 \times 10^{-3}$
$A_6 = -0.42650485 \times 10^{-4}$
$A_8 = 0.12636884 \times 10^{-5}$
$A_{10} = -0.19564138 \times 10^{-7}$

TABLE 7

Aspherical Coefficient of R9

$K = 0.16088563 \times 10$
$A_4 = -0.10512548 \times 10^{-3}$
$A_6 = 0.17724245 \times 10^{-6}$
$A_8 = -0.15983230 \times 10^{-6}$
$A_{10} = 0.47707047 \times 10^{-8}$

TABLE 8

Aspherical Coefficient of R15

$K = 0.17411573 \times 10^{+2}$
$A_4 = -0.32605942 \times 10^{-4}$
$A_6 = -0.27274708 \times 10^{-6}$
$A_8 = 0.12476988 \times 10^{-7}$
$A_{10} = -0.14327874 \times 10^{-9}$

TABLE 9

Magnification = −0.359 to −1.168

| Radius | Distance | Refractive Index | Abbe Number |
|---|---|---|---|
| R1 = 43.176 | D1 = 0.80 | N1 = 1.49200 | v1 = 57.4 |
| R2 = 17.975 | D2 = Variable | | |
| R3 = 22.335 | D3 = 0.80 | N3 = 1.49200 | v3 = 57.4 |
| R4 = 8.091 | D4 = Variable | | |
| R5 = 19.193 | D5 = 1.93 | N5 = 1.49200 | v5 = 57.4 |
| R6 = −31.296 | D6 = 0.68 | | |
| R7 = −29.469 | D7 = 2.35 | N7 = 1.49200 | v7 = 57.4 |
| R8 = −9.926 | D8 = Variable | | |
| R9 = 22.723 | D9 = 5.50 | N9 = 1.49200 | v9 = 57.4 |
| R10 = ∞ | D10 = 4.80 | | |
| R11 = ∞ | D11 = 14.80 | N11 = 1.49200 | v11 = 57.4 |
| R12 = ∞ | D12 = 11.60 | | |
| R13 = 30.822 | D13 = 3.90 | N13 = 1.49200 | v13 = 57.4 |
| R14 = −22.191 | D14 = 17.88 | | |

TABLE 10

| D | $2\omega = 21.0°$ | $2\omega = 31.8°$ | $2\omega = 65.9°$ |
|---|---|---|---|
| D2 | 2.746 | 7.879 | 6.739 |
| D4 | 1.000 | 3.566 | 14.834 |
| D8 | 36.190 | 28.490 | 18.370 |

TABLE 11

Aspherical Coefficient of R2

$K = -0.95305221$
$A_4 = -0.21215771 \times 10^{-4}$
$A_6 = -0.13377052 \times 10^{-5}$
$A_8 = 0$
$A_{10} = 0$

TABLE 12

Aspherical Coefficient of R3

$K = -0.30403221 \times 10^{+2}$
$A_4 = -0.30403221 \times 10^{-2}$
$A_6 = 0.25928152 \times 10^{-3}$
$A_8 = -0.12109943 \times 10^{-4}$
$A_{10} = -0.19868759 \times 10^{-6}$

TABLE 13

Aspherical Coefficient of R4

$K = -0.17191929 \times 10^{+2}$
$A_4 = -0.15238223 \times 10^{-2}$
$A_6 = 0.99704906 \times 10^{-4}$
$A_8 = -0.46051012 \times 10^{-5}$
$A_{10} = 0.83222117 \times 10^{-7}$

TABLE 14

Aspherical Coefficient of R5

$K = -0.88023953 \times 10^{+2}$
$A_4 = 0.67463557 \times 10^{-3}$
$A_6 = -0.38507764 \times 10^{-4}$
$A_8 = 0.11678678 \times 10^{-5}$
$A_{10} = -0.19868759 \times 10^{-7}$

TABLE 15

Aspherical Coefficient of R7

$K = -0.13188563 \times 10^{+2}$
$A_4 = -0.47491803 \times 10^{-4}$
$A_6 = -0.82788475 \times 10^{-6}$
$A_8 = -0.11775149 \times 10^{-7}$
$A_{10} = 0.31178180 \times 10^{-8}$

TABLE 16

Aspherical Coefficient of R13

$K = 0.24200984 \times 10$
$A_4 = 0.13902687 \times 10^{-4}$
$A_6 = -0.76988788 \times 10^{-6}$
$A_8 = 0.12884705 \times 10^{-7}$
$A_{10} = -0.41708505 \times 10^{-11}$

TABLE 17

| Radius | Distance | Refractive Index | Abbe Number |
|---|---|---|---|
| $R1 = \infty$ | $D1 = 0.95$ | $N1 = 1.49200$ | $V1 = 57.4$ |
| $R2 = 16.040$ | $D2 = $ Variable | | |
| $R3 = 10.277$ | $D3 = 0.80$ | $N3 = 1.49200$ | $V3 = 57.4$ |
| $R4 = 6.316$ | $D4 = $ Variable | | |
| $R5 = 17.422$ | $D5 = 0.96$ | $N5 = 1.49200$ | $V5 = 57.4$ |
| $R6 = -36.331$ | $D6 = 0.68$ | | |
| $R7 = -28.717$ | $D7 = 3.49$ | $N7 = 1.49200$ | $V7 = 57.4$ |
| $R8 = -8.786$ | $D8 = $ Variable | | |
| $R9 = 18.325$ | $D9 = 5.50$ | $N9 = 1.49200$ | $V9 = 57.4$ |
| $R10 = \infty$ | $D10 = 3.71$ | | |
| $R11 = \infty$ | $D11 = 24.80$ | $N11 = 1.49200$ | $V11 = 57.4$ |
| $R12 = \infty$ | $D12 = 1.89$ | | |
| $R13 = 23.470$ | $D13 = 2.63$ | $N13 = 1.49200$ | $V13 = 57.4$ |
| $R14 = -20.877$ | $D14 = 20.50$ | | |

TABLE 18

| D | $2\omega = 23.7°$ | $2\omega = 31.8°$ | $2\omega = 63.0°$ |
|---|---|---|---|
| D2 | 3.595 | 6.646 | 2.975 |
| D4 | 1.185 | 3.000 | 15.166 |
| D8 | 29.645 | 24.779 | 16.290 |

TABLE 19

Aspherical Coefficient of R2

$K = -0.20582991 \times 10^{+2}$
$A_4 = 0.51936485 \times 10^{-3}$
$A_6 = -0.161237500 \times 10^{-6}$
$A_8 = 0$
$A_{10} = 0$

TABLE 20

Aspherical Coefficient of R3

$K = -0.39780656 \times 10$
$A_4 = -0.43872858 \times 10^{-2}$
$A_6 = 0.23981111 \times 10^{-3}$
$A_8 = -0.10931149 \times 10^{-4}$
$A_{10} = 0.18411862 \times 10^{-6}$

TABLE 21

Aspherical Coefficient of R4

$K = -0.10701318 \times 10^{+2}$
$A_4 = -0.013126990 \times 10^{-2}$
$A_6 = 0.50047221 \times 10^{-4}$
$A_8 = -0.26951821 \times 10^{-6}$
$A_{10} = 0.49415504 \times 10^{-7}$

TABLE 22

Aspherical Coefficient of R5

$K = -0.68979563 \times 10^{+2}$
$A_4 = 0.85397460 \times 10^{-3}$
$A_6 = -0.46607284 \times 10^{-4}$
$A_8 = 0.11684395 \times 10^{-5}$
$A_{10} = -0.14591877 \times 10^{-7}$

TABLE 23

Aspherical Coefficient of R7

$K = -0.74726710 \times 10$
$A_4 = -0.18939166 \times 10^{-3}$
$A_6 = 0.56234163 \times 10^{-5}$
$A_8 = -0.13148234 \times 10^{-6}$
$A_{10} = 0.20636297 \times 10^{-8}$

TABLE 24

Aspherical Coefficient of R13

$K = -0.11102512 \times 10^{+2}$
$A_4 = 0.13702066 \times 10^{-4}$
$A_6 = 0.30673633 \times 10^{-5}$
$A_8 = -0.11332189 \times 10^{-6}$
$A_{10} = 0.11713777 \times 10^{-8}$ Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A variable magnification finder comprising:
an objective lens group having an overall positive power, including, sequentially from an object, a first lens group and a second lens group each having a negative refractive power, a third lens group and a fourth lens group each having a positive refractive power, and an eyepiece lens group having a positive refractive power,
wherein, the second and third lens groups move to zooming from the wide angle position to the telephoto position, and compensate the change of an aberration resulting from such movement of the second and third lens groups.

2. A finder according to claim 1, wherein each lens is made from a single material.

3. A finder according to claim 2, wherein each lens group is made from a plastic material.

4. A finder according to claim 1, wherein the initial formation of an image is focused near the fourth lens group, and an eyepiece having a positive refractive power is fixedly arranged near the fourth lens group.

5. A finder according to claim 1, wherein the first lens group comprises a lens having a negative refractive power.

6. A finder according to claim 1, wherein the second lens group has at least one lens having a negative refractive power and one surface concave toward an eyepiece.

7. A finder according to claim 1, wherein the third lens group includes at least one lens having a positive refractive power.

8. A finder according to claim 1, wherein the fourth lens group includes a lens having a surface convex toward an object.

9. A finder according to claim 1, wherein one of the first, second, third, and fourth lens groups has an asperipherical objective lens.

10. A finder according to claim 1, further comprising a reflector between the fourth lens group of the object lens group and the eyepiece lens group, and wherein the eyepiece lens group moves to compensate the parallax of the finder.

11. A finder according to claim 10, wherein the reflector comprises a prism.

* * * * *